(12) United States Patent
Marinier et al.

(10) Patent No.: US 8,279,890 B2
(45) Date of Patent: Oct. 2, 2012

(54) METHOD AND APPARATUS FOR SUPPORTING UPLINK PROTOCOL CHANGES

(75) Inventors: Paul Marinier, Brossard (CA); Christopher R. Cave, Verdun (CA); Diana Pani, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 959 days.

(21) Appl. No.: 12/237,503

(22) Filed: Sep. 25, 2008

(65) Prior Publication Data

US 2009/0092079 A1    Apr. 9, 2009

Related U.S. Application Data

(60) Provisional application No. 60/976,159, filed on Sep. 28, 2007, provisional application No. 60/982,634, filed on Oct. 25, 2007, provisional application No. 61/038,443, filed on Mar. 21, 2008.

(51) Int. Cl.
    *H04J 3/16*    (2006.01)
    *H04B 7/00*    (2006.01)

(52) U.S. Cl. ........................ 370/465; 370/310

(58) Field of Classification Search ......... None
    See application file for complete search history.

(56) References Cited

U.S. PATENT DOCUMENTS

| | | | |
|---|---|---|---|
| 2004/0208160 A1* | 10/2004 | Petrovic et al. | 370/350 |
| 2005/0094586 A1* | 5/2005 | Zhang et al. | 370/310 |
| 2007/0097937 A1* | 5/2007 | Kubota et al. | 370/338 |
| 2008/0008152 A1* | 1/2008 | Lohr et al. | 370/342 |
| 2008/0026741 A1* | 1/2008 | Nakamata et al. | 455/420 |
| 2009/0086657 A1* | 4/2009 | Alpert et al. | 370/310 |
| 2009/0086756 A1* | 4/2009 | Tseng | 370/469 |

FOREIGN PATENT DOCUMENTS

| | | |
|---|---|---|
| EP | 1 465 369 | 10/2004 |
| WO | 2007/052098 | 5/2007 |

OTHER PUBLICATIONS

Third Generation Partnership Project, "Technical Specification Group Radio Access Network; Enhanced Uplink; Overall Description; Stage 2 (Release 7)," 3GPP TS 25.319 V7.2.0 (Mar. 2007).

Third Generation Partnership Project, "Technical Specification Group Radio Access Network; Enhanced Uplink; Overall Description; Stage 2 (Release 7)," 3GPP TS 25.319 V7.6.0 (May 2008).

Third Generation Partnership Project, "Technical Specification Group Radio Access Network; Enhanced Uplink; Overall Description; Stage 2 (Release 8)," 3GPP TS 25.319 V8.3.0 (Sep. 2008).

Third Generation Partnership Project, "Technical Specification Group Radio Access Network; Medium Access Control (MAC) Protocol Specification (Release 7)," 3GPP TS 25.321 V7.10.0 (Jun. 2007).

(Continued)

*Primary Examiner* — Clemence Han
(74) *Attorney, Agent, or Firm* — Condo Roccia LLP

(57) ABSTRACT

A method and apparatus for supporting uplink (UL) protocol changes includes reconfiguring a medium access control (MAC) protocol from a first MAC protocol to a second MAC protocol. A hybrid automatic repeat request (HARD) process associated with the first MAC protocol is flushed, and a MAC-e/es reset is performed. Segments of a MAC-e/es packet data unit (PDU) that are contained in a segmentation entity are discarded.

11 Claims, 8 Drawing Sheets

OTHER PUBLICATIONS

Third Generation Partnership Project, "Technical Specification Group Radio Access Network; Medium Access Control (MAC) Protocol Specification (Release 7)," 3GPP TS 25.321 V7.10.1 (Sep. 2008).

Third Generation Partnership Project, "Technical Specification Group Radio Access Network; Medium Access Control (MAC) Protocol Specification (Release 8)," 3GPP TS 25.321 V8.3.0 (Sep. 2008).

Third Generation Partnership Project, "Technical Specification Group Radio Access Network; HSPA Evolution (FDD); (Release 7)," 3GPP TR 25.999 V2.1.0 (May 2007).

Third Generation Partnership Project, "Technical Specification Group Radio Access Network; Enhanced Uplink; Overall Description ; Stage 2 (Release 7)," 3GPP TS 25.319 V7.2.0 (Mar. 2007).

Third Generation Partnership Project, "Technical Specification Group Radio Access Network; Enhanced Uplink; Overall Description ; Stage 2 (Release 8)," 3GPP TS 25.319 V8.3.0 (Sep. 2008).

Third Generation Partnership Project, "Technical Specification Group Radio Access Network; Medium Access Control (MAC) Protocol Specification (Release 7)," 3GPP TS 25.321 V7.5.0 (Jun. 2007).

Third Generation Partnership Project, "Technical Specification Group Radio Access Network; Medium Access Control (MAC) Protocol Specification (Release 7)," 3GPP TS 25.321 V7.10.0 (Sep. 2008).

Third Generation Partnership Project, "Technical Specification Group Radio Access Network; Enhanced Uplink; Overall Description; Stage 2 (Release 7)," 3GPP TS 25.319 V7.2.0 (March 2007).

Third Generation Partnership Project, "Technical Specification Group Radio Access Network; HSPA Evolution (FDD); (Release 7)," 3GPP TR 25.999 V2.2.0 (Sep. 2007).

Third Generation Partnership Project, "Technical Specification Group Radio Access Network; High Speed Packet Access (HSPA) Evolution; Frequency Division Duplex (FDD); (Release 7)," 3GPP TR 25.999 V7.1.0 (Mar. 2008).

Third Generation Partnership Project, "Technical Specification Group Radio Access Network; Radio Resource Control (RRC); Protocol Specification, (Release 7)," 3GPP TS 25.331 V7.5.0 (Jun. 2007).

Third Generation Partnership Project, "Technical Specification Group Radio Access Network; Radio Resource Control (RRC); Protocol Specification, (Release 7)," 3GPP TS 25.331 V7.10.0 (Sep. 2008).

Third Generation Partnership Project, "Technical Specification Group Radio Access Network; Radio Resource Control (RRC); Protocol Specification, (Release 8), " 3GPP TS 25.331 V8.4.0 (Sep. 2008).

3rd Generation Partnership Project (3GPP), R2-071186, "Mobility and Interworking between R6 and R7," InterDigital, 3GPP TSG-RAN WG 2 #57bis, Mar. 26-30, 2007, 3 pages.

3rd Generation Partnership Project (3GPP), R2-071568, "Mobility and Interworking between R6 and R7", InterDigital, 3GPP TSG-RAN WG2#57bis, Malta, Mar. 26-30, 2007, 3 pages.

* cited by examiner

METHOD AND APPARATUS FOR SUPPORTING UPLINK PROTOCOL CHANGES

CROSS REFERENCE TO RELATED APPLICATIONS

This application claims the benefit of U.S. Provisional Application Nos. 60/976,159, filed Sep. 28, 2007, 60/982,634, filed Oct. 25, 2007, and 61/038,443, filed Mar. 21, 2008, all of which are incorporated by reference as if fully set forth.

FIELD OF INVENTION

This application is related to wireless communications.

BACKGROUND

In a third generation partnership project (3GPP) Release 6 (R6) system, the Radio Link Control (RLC) layer in acknowledged mode (AM) operates using fixed protocol data unit (PDU) sizes. In addition, the medium access control high speed (MAC-hs) layer in the base station and the medium access control (MAC) in the wireless transmit/receive unit (WTRU) do not support segmentation of service data units (SDUs) from higher layers. These restrictions may result in performance limitations, especially as high speed packet access (HSPA) evolves towards higher data rates.

In order to achieve higher data rates and reduce protocol overhead and padding, a number of new features to the layer 2 (L2) protocol were introduced in Release 7 of the 3GPP specifications. Flexible RLC PDU sizes and MAC segmentation in the downlink were among the concepts introduced. It has also been proposed to enhance L2 operation in the uplink. Some enhancements that have been proposed are directed toward, for example: introducing support for flexible RLC PDU sizes, introducing support for MAC segmentation, allowing for smooth transition between old and new protocol formats, and supporting seamless state transitions between CELL_DCH, CELL_FACH, CELL_PCH and URA_PCH, (e.g., dependent on potential enhancements to the CELL_FACH UL transmission).

FIG. 1 shows a conventional protocol architecture 100, (e.g., with MAC layer and below) with the use of an enhanced dedicated channel (E-DCH), such as described in Release 7 of the 3GPP specifications. The MAC sub-layers specific to the use of E-DCH are the MAC-es and MAC-e sublayers. Potentially, improvements to L2 protocols could be achieved by enhancing the RLC sub-layer (not shown in FIG. 1), the MAC-es and the MAC-e sub-layers. It should be noted that only the MAC-e sub-layer is terminated in the base station.

The improved L2 enhanced MAC-e/es entity may be referred to as a MAC-i/is entity. The improved L2 features can be used for E-DCH transmission in CELL_DCH or for E-DCH transmission in CELL_FACH. The latter is also referred to as E-RACH transmission.

Since the deployment of a new feature such as improved uplink (UL) Layer 2 protocols in a system usually cannot be performed in the whole system at the same time, for a period of time there will be areas covered by base stations that do not support the new feature. This may be the case even if these base stations are part of a radio network subsystem controlled by a radio network controller (RNC) supporting the new feature. As these legacy base stations will be adjacent to base stations implementing the new feature ("enhanced base stations"), there will be WTRUs starting their communications within the area covered by enhanced base stations and moving within an area covered by legacy base stations.

It would therefore be beneficial to provide a method and apparatus to support uplink protocols in the area covered by enhanced base stations while providing a smooth transition as a WTRU moves into an area covered by legacy base stations.

SUMMARY

A method and apparatus for supporting uplink (UL) protocol changes is disclosed. The method includes reconfiguring a medium access control (MAC) protocol. A hybrid automatic repeat request (HARQ) process is flushed, and a MAC-e/es reset is performed.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 2:
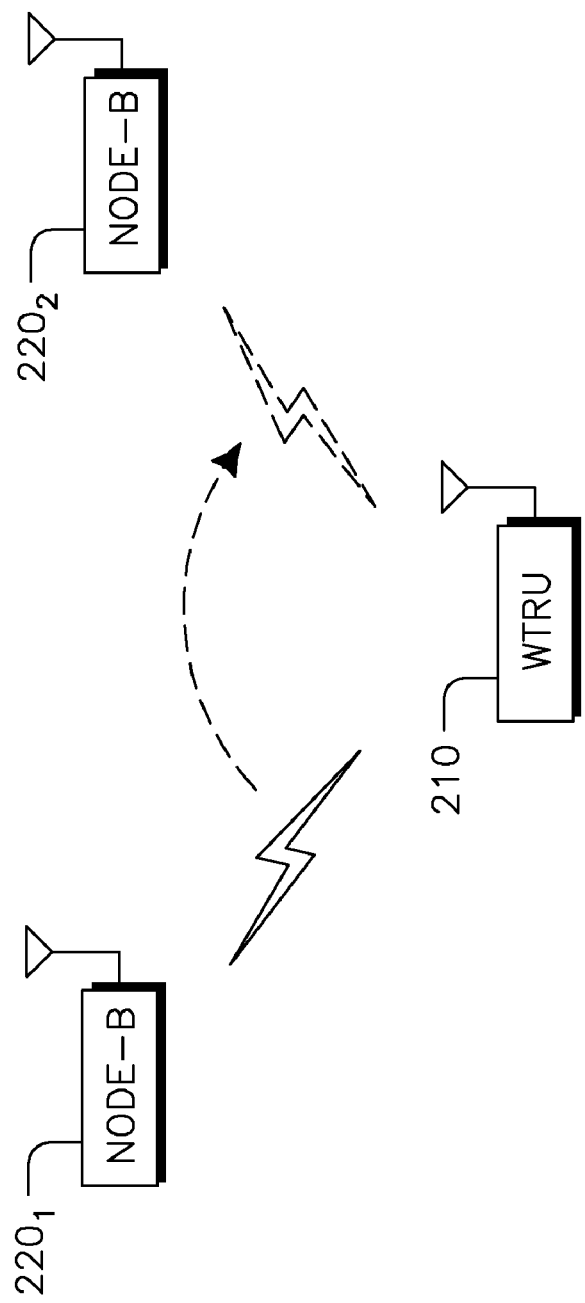
FIG. 2 shows an example wireless communication system that includes a WTRU and a plurality of Node-Bs.

FIG. 2 shows an example wireless communication system 200 that includes a WTRU 210 and a plurality of Node-Bs 220, (designated $220_1$ and $220_2$). As shown in FIG. 2, the WTRU 210 is in communication with the Node-B $220_1$. In the example shown in FIG. 2, the WTRU 210 may transition from communication with Node-B $220_1$ to Node-B $220_2$, where Node-B $220_1$ is an enhanced Node-B, (e.g., Release 8 of the 3GPP specifications Node-B), and Node-B $220_2$ is a non-enhanced Node-B, (e.g., Release 6 or 7), that has been added to the active set. It should be noted that, although an example configuration of a WTRU 210 and Node-Bs 220 is depicted in FIG. 2, any combination of wireless and wired devices may be included in the wireless communication system 200. For example, a radio network controller (RNC—not shown), may be included in the wireless communication system 200 and in communication with one or more Node-Bs 220.

Figure 3:
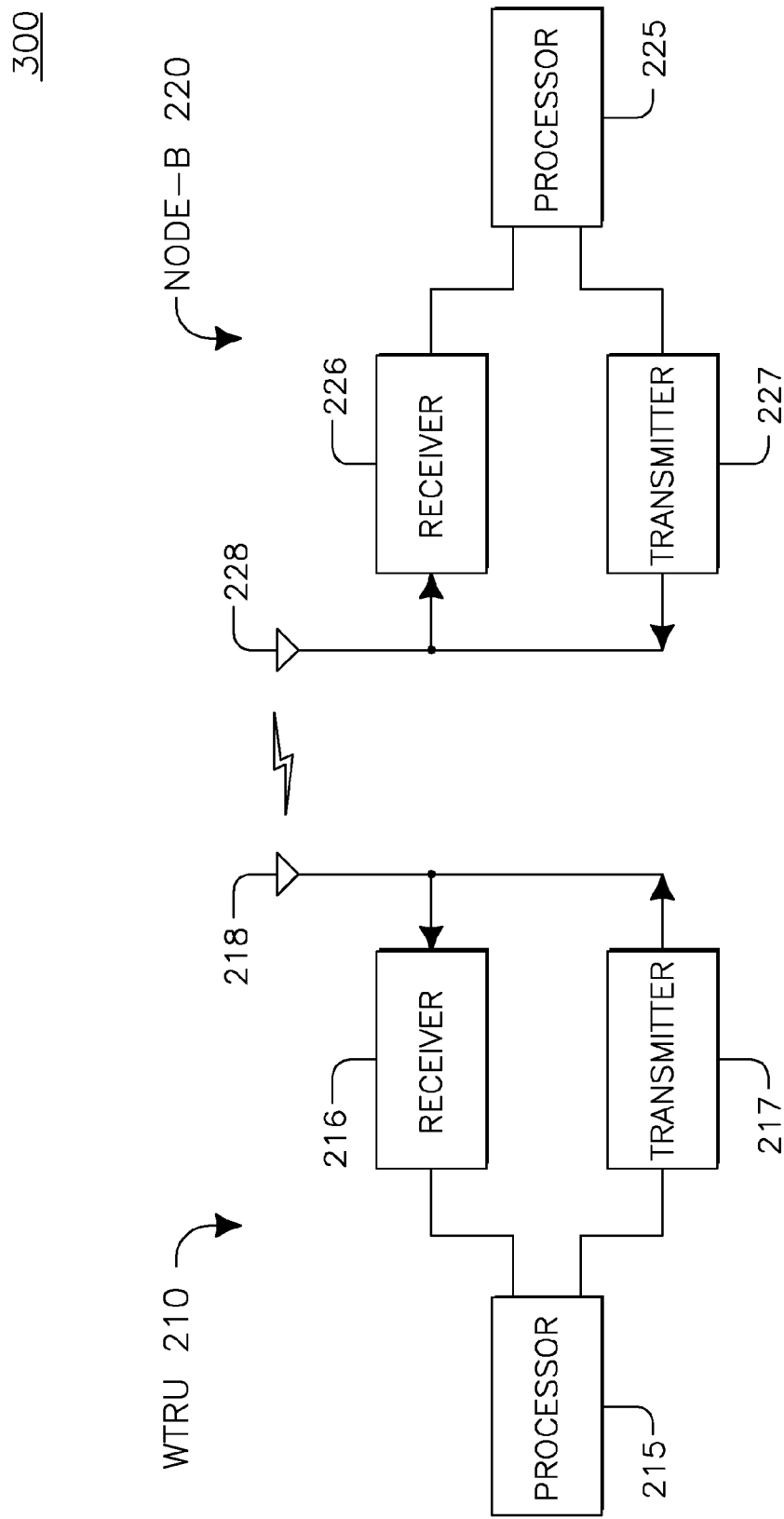
FIG. 3 is an example functional block diagram of the WTRU and a Node-B of FIG. 2.

FIG. 3 is an example functional block diagram 300 of the WTRU 210 and a Node-B 220 of the wireless communication system 200 of FIG. 2. As shown in FIG. 3, the WTRU 210 is in communication with the Node-B 220.

In addition to the components that may be found in a typical WTRU, the WTRU 210 includes a processor 215, a receiver 216, a transmitter 117, and an antenna 218. The receiver 216 and the transmitter 117 are in communication with the processor 215. The antenna 218 is in communication with both the receiver 216 and the transmitter 117 to facilitate the transmission and reception of wireless data. The processor 215 of the WTRU 210 is configured to support UL protocols.

In addition to the components that may be found in a typical Node-B, the Node-B 220 includes a processor 225, a receiver 226, a transmitter 227, and an antenna 228. The receiver 226 and the transmitter 227 are in communication with the processor 225. The antenna 228 is in communication with both the receiver 226 and the transmitter 227 to facilitate the transmission and reception of wireless data. The processor 225 of the Node-B 220 is configured to support UL protocols.

A number of methods to allow the WTRU 210 to operate with a legacy Node-B 220 while connected to an enhanced UL L2 serving radio network controller (SRNC) are described below. In this manner, the WTRU 210 may be able to utilize enhanced L2 protocols while connected to a legacy, (e.g., R6, R7), Node-B 220 if the SRNC is an R8 SRNC. Additionally, methods are described below that may provide smooth transitions as the WTRU 210 transitions to and from areas that support enhanced L2 protocols and those that do not, as well as a method for recovering data.

In addition, although some methods described below refer to the UL context, they are also applicable to the downlink (DL) where there is a collapsed architecture, such as where, for example, Node-B and RNC functionalities may reside in one node. The term "MAC-i/is" entity refers to an enhanced MAC-e/es entity with UL L2 improvements. Therefore, MAC-i/is and MAC-e/es may be used interchangeably throughout the following description.

A WTRU 210 operating in an enhanced L2 protocol may also resort back to operating in a conventional L2 protocol if a non-enhanced Node-B 220 is added to the active set. Conversely, if all Node-Bs 220 in the active set are enhanced Node-Bs, then the WTRU 210 operating in a conventional L2 protocol may need to perform some reconfiguring functions if it desires to operate using the enhanced L2 protocol.

In one example, when the MAC protocol changes to or from an enhanced to non-enhanced protocol, any hybrid automatic repeat request (HARQ) processes are flushed. In addition, a full MAC-e/es reset may be performed. The MAC-e/es reset can be signaled via radio resource control (RRC) messages, such as RRC reconfiguration messages, (i.e., radio bearer reconfiguration, transport channel reconfiguration, and the like), or via an active set update message.

Figure 4:
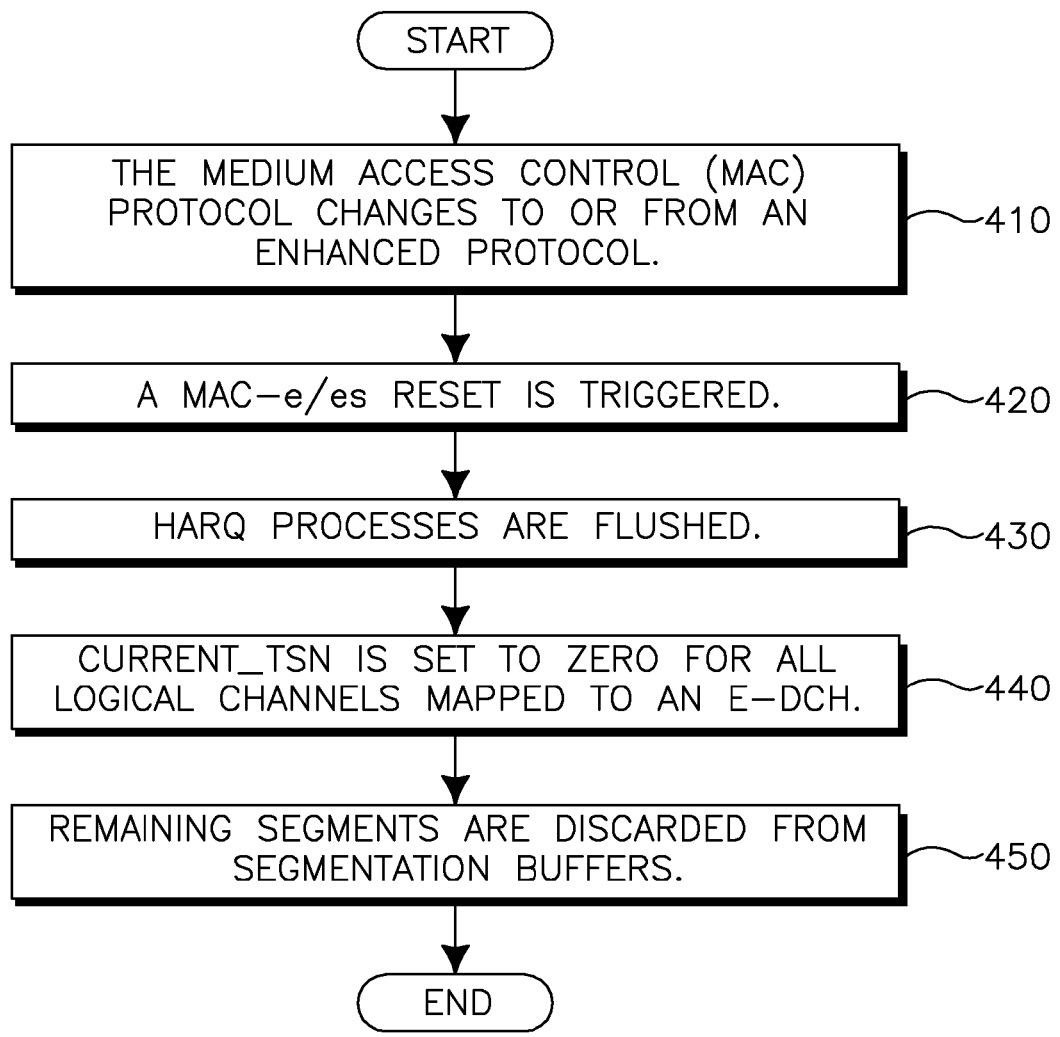
FIG. 4 is a flow diagram of a method of performing a MAC reset.

FIG. 4 is a flow diagram of a method 400 of performing a MAC reset. In step 410, the MAC protocol changes to or from an enhanced protocol. For example, the MAC protocol may change from a non-enhanced protocol to an enhanced protocol when all Node-Bs in the active set are enhanced Node-Bs, and may change from an enhanced protocol to a non-enhanced protocol when a non-enhanced Node-B is added to the active set.

When the MAC protocol changes (step 410), a MAC-e/es reset may be triggered (step 420). Once this occurs, HARQ processes are flushed (step 430), the state variable CURRENT_TSN is set to zero for all logical channels mapped to an E-DCH (step 440), and any remaining segments are discarded from the segmentation buffers, or entities (step 450).

As described above, RRC signaling may be utilized to notify the WTRU 210 of an L2 protocol change. In order to accomplish this, one or more of the following messages may be utilized to signal a reconfiguration:

Active Set Update: one or more of the following configuration information elements (IEs) or information may be added to the Active Set Update message:
"RLC info" that alerts the WTRU 210 to change between fixed and flexible RLC PDUs when required.
A change between enhanced MAC-e/es and normal MAC-e/es. This should be signaled within this message, as part of the E-DCH info or reconfigured links.
A MAC-e/es reset indicator.
Radio bearer (RB) mapping information.
"RB information to reconfigure" IE—a list of all radio bearers to reconfigure with the new protocol. The IE "RB information to reconfigure" may contain some of the other information elements listed above such as, RLC info, RB mapping information, and the like.

Reconfiguration Message (radio bearer/transport channel reconfiguration): An active set update may be followed by an RRC reconfiguration message that updates the Layer 2 protocol parameters. Alternatively, the reconfiguration of the layer 2 can be signaled with the RRC reconfiguration message directly, without the active set update. The change of the UL RLC protocol from fixed to flexible can be signaled in this message. Additionally, the IE "RLC info" can be modified such that it indicates what version of the RLC protocol is being used for the uplink, (e.g., fixed or flexible). The RRC messages should also signal whether the enhanced MAC-e/es or the old MAC-e/es is being used.

Figure 5:
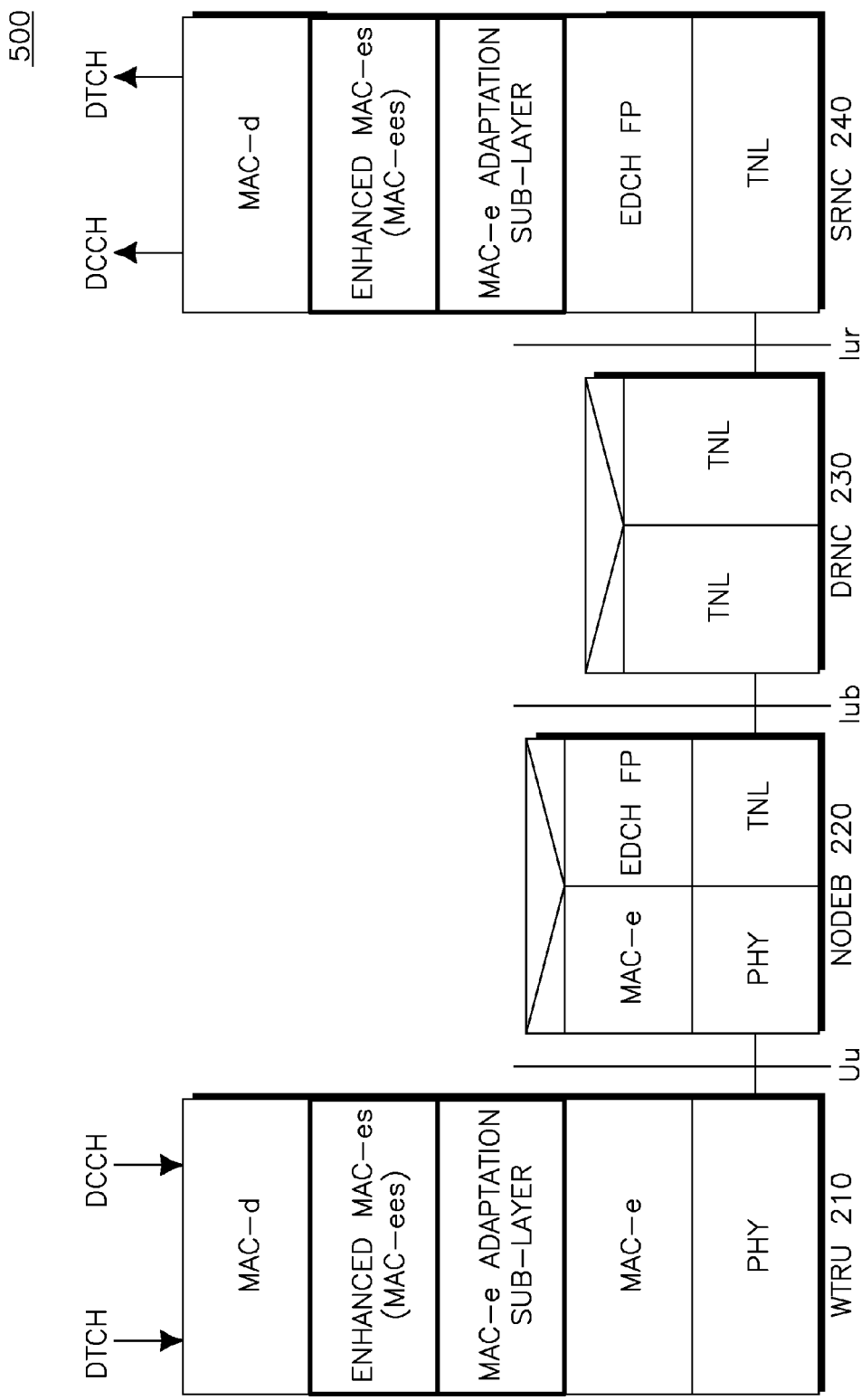
FIG. 5 shows an E-DCH protocol architecture.

One of the ways to handle reconfigurations from and to an enhanced L2 protocol is to utilize operations and interfaces at the sublayers of the devices in a wireless communication system, such as the wireless communication system 200 of FIG. 2. Accordingly, FIG. 5 shows an E-DCH protocol architecture 500. The protocol architecture 500 includes the WTRU 210, Node-B 220, DRNC 230, and SRNC 240.

Figure 1:
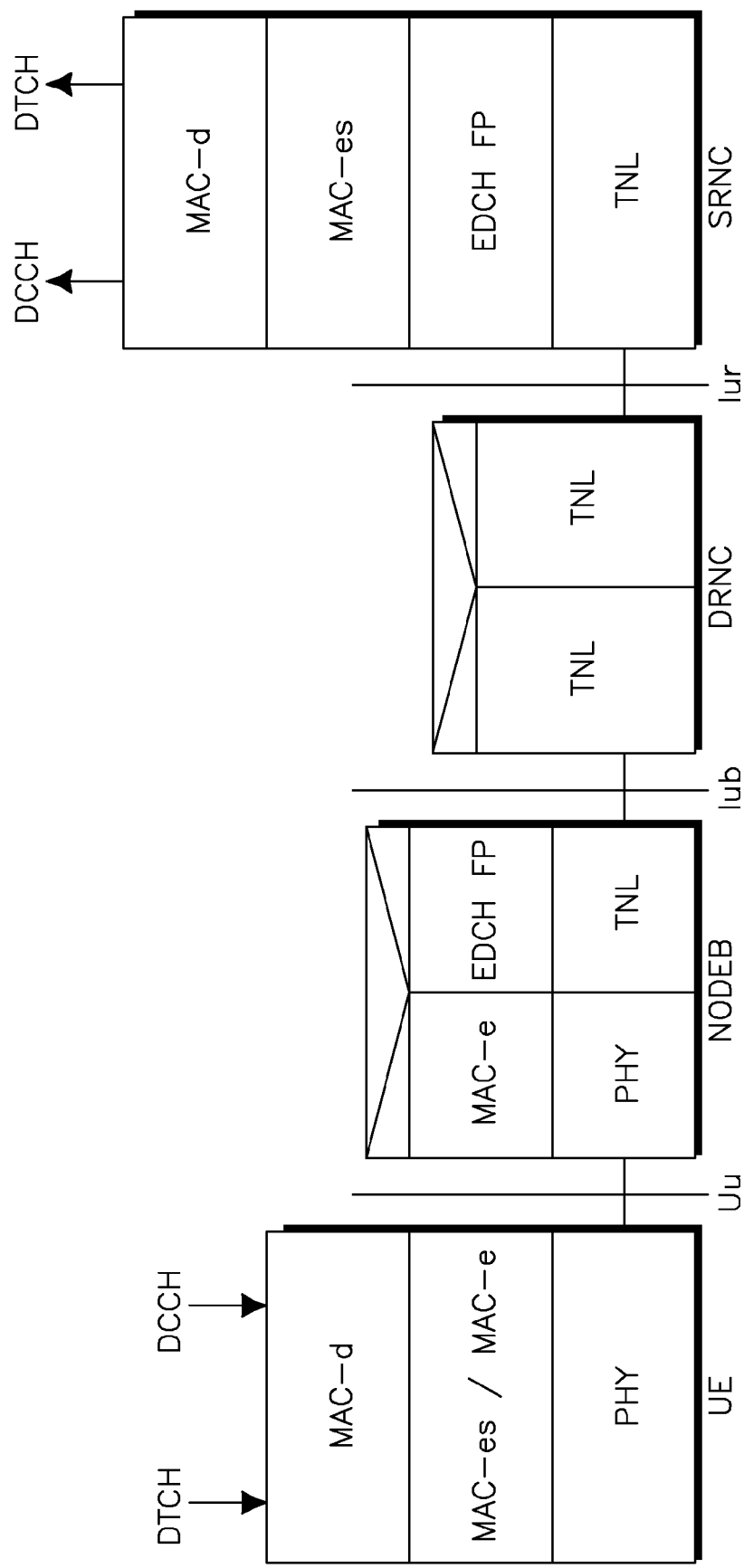
FIG. 1 shows a conventional protocol architecture.

The MAC-e sub-layer is unchanged in the protocol architecture 500 from that of conventional architectures, such as in FIG. 1. The enhanced MAC functionality, such as segmentation and/or logical channel multiplexing, is entirely supported by the enhanced MAC-es sub-layer, referred to as "MAC-ees" in FIG. 5. This allows the WTRU 210 and SRNC 240 to use the enhanced functionality with a legacy Node-B 230.

An adaptation sub-layer, (i.e., MAC-e adaptation sub-layer in FIG. 5), is inserted between the MAC-ees and the MAC-e, and one resides in both the WTRU 210 and SRNC 240. The adaptation sub-layer at the WTRU 210 side constructs a MAC-e PDU that can be properly processed by a legacy Node-B. This construction will be described in more detail below referring to the layers, or sub-layers depicted in FIG. 5 and the MAC PDU creation diagrams of FIGS. 6, 7, and 8. The legacy Node-B 220 receives the data generated from the MAC-ees within the MAC-e PDU and recognizes it as legacy MAC-es PDUs. The Node-B 220 therefore processes them as legacy MAC-es PDUs, accordingly. The MAC-es PDUs are then forwarded to the SRNC 240 where, again, they are processed initially as legacy MAC-es PDUs. However, these MAC-es PDUs transmitted using the E-DCH frame protocol are subsequently processed by the adaptation sub-layer in the SRNC 240, which converts them into MAC-ees PDUs.

Accordingly, the WTRU 210 does not have to switch to the legacy L2 protocols, (i.e., old MAC-e/es and fixed RLC PDU sizes), when a non-enhanced Node-B 220 is added to the active set. As long as the SRNC 240 is an R8 SRNC 240, (i.e., contains a MAC-ees and MAC-e adaptation sub-layer, the WTRU 210 can operate with the enhanced L2 protocols. The logical channel identification and the MAC-ees functionalities may be processed in a number of ways.

For example, in one embodiment, the meaning of logical channel indices, in terms of quality of service (QoS) characteristics, is maintained at the MAC-e sub-layer. This means that logical channel #n at the MAC-e sub-layer means the same as logical channel #n at the layers above. In this manner, the Node-B 220 may properly schedule the WTRUs 210 according to the QoS of its different logical channels. Moreover, the Node-B 220 performs de-multiplexing of the MAC-e PDU into MAC-es PDUs and forwards them over the Iub interface to the SRNC.

Figure 6:
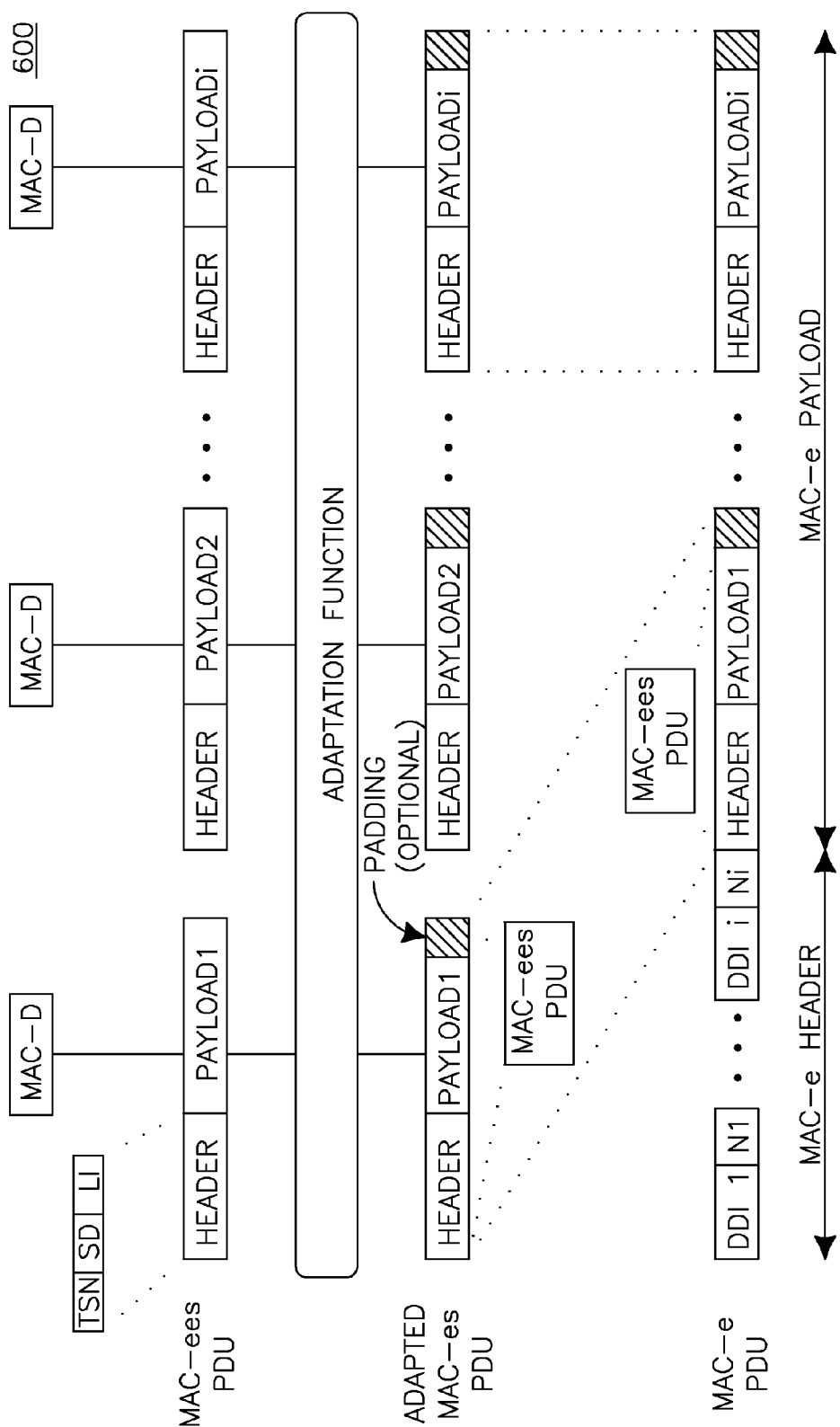
FIG. 6 shows an example diagram of a MAC PDU creation.

FIG. 6 shows an example diagram 600 of a MAC PDU creation. The different functionalities of each MAC-ees, adaptation function, and MAC-e layer are all depicted in FIG. 6. The functionality of the MAC-ees sub-layer includes the following. At the WTRU 210 side, the MAC-ees SDUs (or MAC-d PDUs) from a given logical channel, or possibly a given MAC-d flow, are concatenated and/or segmented to fit into the available number of bits for this logical channel (or MAC-d flow) for this transmission. The resulting data, in addition to the MAC-ees header form a MAC-ees PDU. The MAC-ees header includes, for each reordering PDU, the following information:

A transmission sequence number (TSN) field used to help reordering at the SRNC.

A segmentation description (SD) field used to indicate whether the first and last parts of the MAC-ees PDU are segments or full PDUs (in a manner similar to MAC-ehs).

Fields indicating the lengths of each MAC-ees SDUs or segments thereof (for instance, length indicators (LI) indicating the number of bytes of each segment).

The logical channel identity may be omitted from the MAC-ees header and be indicated by a data description indicator (DDI) field of the MAC-e header as it is in Release 6/7 of the 3GPP specifications. However, the logical channel identity can also be present for each MAC-ees SDUs (or segment thereof), or each MAC-ees.

The functionality of the adaptation function includes the following. At the WTRU 210 side, the sub-layer determines, for each reordering PDU, a combination of DDI and N fields that represents a virtual MAC-es PDU size whose size is larger than or equal to the size of this MAC-ees PDU including the header. The adaptation sub-layer selects a combination that represents a size as close as possible to the actual size of the MAC-ees PDU (minus the size of TSN field).

For instance, if the MAC-ees PDU has a size of 3100 bits and there exists a DDI value that is mapped to the corresponding logical channel with a MAC-d PDU size of 320 bits, the adaptation function may select this DDI having N=10. Once the proper combination of DDI and N is found, the adaptation sub-layer appends, to each MAC-ees PDU, the required number of padding bits that makes its expanded size match the size of a virtual MAC-es PDU corresponding to the DDI and N combination. In the example described, the adaptation sub-layer would need to append 106 bits, (i.e., 320×10−3100+6), so that the size of the expanded MAC-ees PDU, excluding the 6 bits of the TSN, matches that of a MAC-es PDU consisting of 10 MAC-es SDUs of size 320 bits.

Also, the adaptation layer may choose to refrain from adding any padding to the MAC-ees PDU. This adding may be avoided by restricting the MAC-ees sub-layer to create MAC-ees PDUs that are of size equal to one of the combination of the predefined set of sizes. However, in the case where not enough data is available, the adaptation function adds padding to the MAC-ees PDU. The selected MAC-ees PDU size is selected such that it is as close as possible to the maximum allowed number of bits or available number of bits for that logical channel. The ability to segment or request the RLC to send flexible RLC PDU sizes can allow this to be achieved.

The MAC-e sub-layer of the WTRU 210 then constructs a MAC-e PDU consisting of the selected DDI and N values for each MAC-es PDU, the MAC-ees PDU expanded with the needed number of padding bits, and optionally the DDI and/or scheduling information fields. It should be noted that the multiplexing of different logical channels, (i.e., MAC-es PDUs), into a MAC-e PDU is maintained at the MAC-e layer.

Accordingly, as shown in FIG. 6, the MAC-e header portion of the MAC-e PDU includes and DDI and N fields that are appended to the MAC-e payload. The MAC-e payload then is formed from the adapted MAC-es PDU, where the MAC-ees PDU header and payload are included.

At the Node-B 220 side, the MAC-e sub-layer processes MAC-e PDUs in a similar manner as in a conventional wireless communication system. That is, each MAC-e PDU is de-multiplexed into MAC-es PDUs that are transmitted using the E-DCH frame protocol, passing the DDI and N field of each MAC-es PDU over the Iub. Since the MAC-e sub-layer in a legacy Node-B 220 isn't aware of padding bits, it processes each expanded MAC-ees PDU as an R6/R7 MAC-es PDU.

At the network side, the operations described above are generally reversed. For example, the different MAC-ees PDUs are de-multiplexed and the data is routed to reordering, disassembly, and reassembly entities corresponding to the respective logical channels (or MAC-d flows). The MAC-ees SDUs at the output of the disassembly and reassembly entities are then sent to the upper layers.

For example, the SRNC 240 receives the MAC-es PDUs on their respective MAC-d flows and a redistribution functional layer in the SRNC 240 sends them to the correct logical channel flow based on the DDI field. Alternatively, if the DDI field is not utilized and the MAC-ees header contains a logical channel identity (LCH-ID), a queue distribution function can route the PDUs based on the LCH-ID field.

The adaptation sub-layer at the SRNC 240 side then extracts the MAC-ees PDU from the MAC-es PDU. This is done by removing any padding bits that were added to make the MAC-ees PDU fit into one of the predefined sizes. The removal of the padding bits can be done by reading the MAC-ees header field that indicates the length, (e.g., in the LI field), of the individual MAC-ees SDU or segment. Alternatively, the removal of the appropriate number of padding bits is performed in the MAC-ees sub-layer. At this point, the MAC-ees PDU can then be routed to the MAC-ees sub-layer. Once it reaches the MAC-ees sub-layer in the SRNC 240, the header of the MAC-ees PDU may then be utilized to reorder and disassemble the MAC-ees PDU into MAC-ees SDUs and segments thereof.

It should be noted that the removal of the padding bits can be done prior to reordering or after reordering as part of the disassembly/reassembly process. It should also be noted that in order to facilitate efficient operation with the adaptation sub-layer, the DDI values for each logical channels may be designed in such a way that the number of padding bits is minimized.

As an alternative to FIG. 6, the logical channel indices are not necessarily discernable between the MAC-e and other sub-layers. Different logical channels at the MAC-e sub-layer may be defined for the purpose of facilitating the mapping of the different DDI values to different payload sizes. From the WTRU 210 side, the values of DDI mapping and N are used to increase the set of possible sizes the WTRU 210 can indicate to the Node-B 220. More specifically, DDI*N would give the total size of the MAC-es PDU or alternatively the total size of the MAC-ees PDU, (i.e., the size of all reordering PDUs multiplexed together).

Accordingly, the 6 bits of the DDI field are used by the WTRU 210 to give a larger set of possible sizes. An R8 Node-B 220 is aware that the DDI field corresponds to a set of MAC-ees PDU sizes and knows not to associate the DDI to a logical channel, MAC-d flow and MAC-d PDU size. However, an R7 Node-B 220 interprets the DDI field differently, and the R7 Node-B 220 could be configured to also consider the logical channel and MAC-d flow of that DDI field. However, even though the MAC-es PDU is forwarded with the DDI and N field over the Iub frame, the SRNC 240 ignores the DDI and N field provided and processes the received PDU accordingly.

Figure 7:
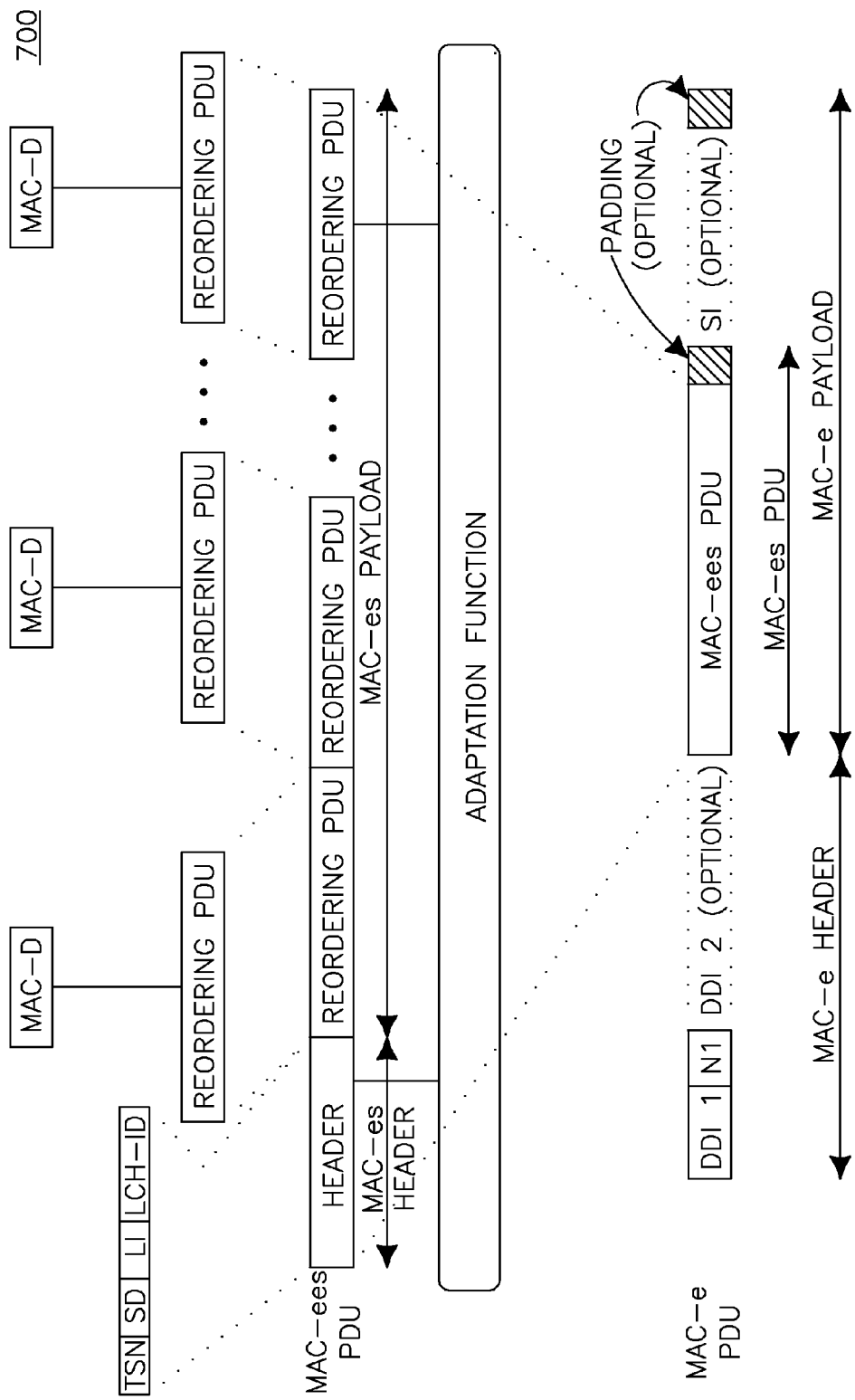
FIG. 7 shows an example diagram of an alternative MAC PDU creation.

FIG. 7 shows an example diagram 700 of an alternative MAC PDU creation. In FIG. 7, the functionality of the MAC-ees sub-layer includes the following. At the WTRU 210 side, the MAC-ees SDUs (or MAC-d PDUs) from a given logical channel (or possibly a given MAC-d flow) are concatenated and/or segmented to fit into the available number of bits for this logical channel (or MAC-d flow) for this transmission. The result from this operation is called a "reordering PDU". In addition, the MAC-ees sub-layer multiplexes the reordering PDUs from different logical channels (or MAC-d flows) together and appends the result with a MAC-ees header, to form a MAC-ees PDU. The MAC-ees header includes, for each reordering PDU, the following information:
- A transmission sequence number (TSN) field used to help reordering at the SRNC.
- A segmentation description (SD) field used to indicate whether the first and last parts of the reordering PDUs are segments or full PDUs (in a manner similar to MAC-ehs).
- Fields indicating the lengths of each MAC-ees SDUs or segments thereof (for instance, length indicators (LI) indicating the number of bytes of each segment).
- Logical channel identity for each MAC-ees SDUs (or segment thereof), or possibly only for each reordering PDU.

At the WTRU 210 side, the adaptation sub-layer determines, for the resulting MAC-ees PDU, a combination of DDI and N fields that represent a virtual MAC-es PDU size whose size is larger than or equal to the size of this MAC-ees PDU, in a similar way as utilized in FIG. 6. One difference is that only one MAC-ees PDU is present in the MAC-e PDU, and thus only one DDI and N field will be incorporated into the MAC-e PDU. The adaptation function also ensures that the number of padding bits is minimized.

The MAC-e sub-layer of the WTRU 210 then constructs a MAC-e PDU consisting of the selected DDI and N value for the MAC-ees PDU, the MAC-ees PDU expanded with the needed number of padding bits, and optionally the DDI (DDI 2), scheduling information (SI) fields, and/or padding bits. In this operation, the MAC-e header will include the DDI and N fields, and optionally any additional DDI fields, (e.g., DDI 2). The MAC-e payload portion then will included the MAC-es PDU, (which includes the MAC-ees PDU and any padding bits), and optionally any SI fields.

Again, at the Node-B 220 side, the MAC-e sub-layer may process MAC-e PDUs in a conventional manner. That is, since only one DDI and N field is present, the MAC-es PDU is extracted from the MAC-e PDU, which is then transmitted over the Iub frame protocol. Again, since the MAC-e sub-layer isn't aware of the padding bits in the MAC-es PDU, it is not aware that the MAC-es PDU contains data from more than one logical channel.

At the SRNC 240 side, in general, the reverse operations are performed. For example, the different reordering PDUs are de-multiplexed and the data is routed to the reordering, disassembly, and reassembly entities corresponding to the respective logical channels (or MAC-d flows). The MAC-ees SDUs at the output of the disassembly and reassembly entities are then sent to the upper layers.

The adaptation sub-layer at the SRNC 240 side extracts the MAC-ees PDU from the MAC-es PDU. This is done by removing the padding bits that were added to make the MAC-ees PDU fit into one of the predefined sizes. The removal of the padding bits can be done by reading the MAC-ees header field that indicates the length of the individual reordering PDUs, MAC-ees SDU, or segment within each reordering PDU. The MAC-ees PDU can then be routed to the MAC-ees sub-layer, where the header of the MAC-ees PDU is used to de-multiplex the MAC-ees PDU into the original reordering PDUs. The reordering PDUs can then be routed to the correct reordering flow, where reordering, disassembly, or reassembly is performed.

Alternatively, the removal of the appropriate number of padding bits may be performed in the MAC-ees sub-layer, which may done when the de-multiplexing of the MAC-es PDU into reordering PDUs is performed. Again, it should be noted that in order to facilitate efficient operation with the adaptation sub-layer, the DDI values for each logical channels may be designed in such a way that the number of padding bits is minimized.

Figure 8:
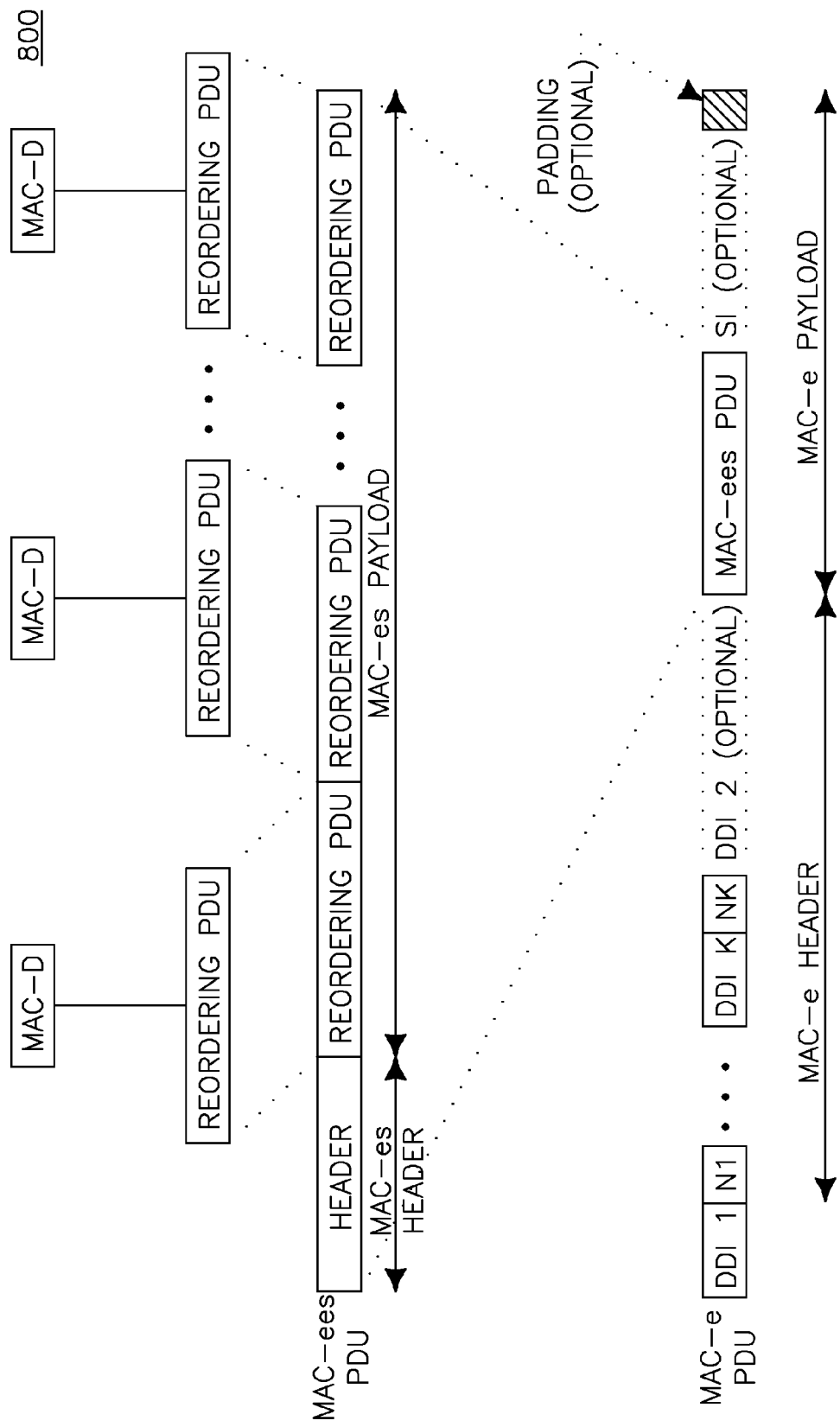
FIG. 8 shows an example diagram of another alternative MAC PDU creation.

FIG. 8 shows an example diagram 800 of another alternative MAC PDU creation. In this way, several DDI and N fields, (e.g., DDI 1 . . . DDI K and N1 . . . NK), are used to describe the length of the MAC-ees PDU, whether it is the MAC-ees PDU described in FIG. 6 or 7 above. The DDI values consist of a number of base values, (e.g., 1, 10, 1000, 10000, etc.), and the combination of the different bases and N fields can indicate the total length of the MAC-ees PDU, or data being sent. The sum of all DDI*N fields give the total size of the MAC-ees PDU. For example, if the size of the PDU is 23040 bits, the corresponding DDI and N fields will be the following: ($DDI_1$ index=10000, $N_1$=2), ($DDI_2$ index=1000, $N_2$=3), and ($DDI_3$ index 10, $N_3$=4). In this example, The MAC-e header then includes the DDI1/N1 . . . DDIK/NK fields and any additional DDI, (e.g., DDI 2) fields, while the MACe-payload portion includes again the MAC-ees PDU and any padding or SI fields.

On the network side, the legacy Node-Bs 220 have to be configured in this instance, with the same bases that are used above. In order to ensure backward compatibility and avoid cases where the Node-B 220 receives DDI fields that belong to the same logical channel, the network can configure all the DDI bases to belong to different logical channels, (i.e., base DDI=10 is configured for logical channel 1, and DDI=1000 for logical channel 2, and so on). This can be done via Node-B application part (NBAP) signaling. Alternatively, the DDI bases can be part of the same logical channel and MAC-d flow.

When the Node-B 220 receives the MAC-e PDU, it may then assume that each DDI and N field belongs to a MAC-es PDU and thus de-multiplex or fragment the MAC-e PDU into many segments. The segments are sent to the SRNC 240 and the adaptation layer in the SRNC 240 reassembles all segmented data into a MAC-ees PDU. The MAC-ees PDU is then sent to the MAC-ees sub-layer and processed.

When a legacy Node-B 220 is added to an an R8 active set, making all Node-Bs R8 Node-Bs 220, the WTRU 210 and the R8 Node-Bs 220 change the MAC-e header format, initiate the adaptation sub-layer functionality and start interpreting the MAC-e header as a legacy MAC-e protocol.

It may be that the R8 MAC-e format is static and is the same as in the legacy MAC-e format. This can be accomplished using one of the options described above in FIGS. 5, 6, 7, and 8, where the adaptation layer becomes an entity that is always present when the WTRU 210 is connected to an R8 SRNC 240.

However, in the cases where the R8 MAC-e format is different than the one to be used when a legacy Node-B 220 is added to the active set or vice versa, methods to deal with the change in the MAC-e protocol behavior may be required. For example, When an active set update occurs, and a legacy Node-B 220 is added to an active set with only R8 Node-Bs 220 or vice versa, the WTRU 210 and the Node-Bs have to be made aware of the change. In particular, all R8 Node-Bs 220 will need to be made aware of the change.

The WTRU 210 can be informed of the change in the MAC-e header via the RRC Active Set Update message or the WTRU 210 can implicitly detect that a R7/R6 Node-B 220 was added. When the WTRU 210 receives this indication or detects the change, the WTRU 210 may perform one, or a combination of the following steps as part of the active set update procedure at the given activation time or time of handover:

Flush the HARQ processes that contain MAC-e PDUs with an R8 MAC-e format.
Perform a MAC-e/es reset, (i.e., Reset TSN, flush HARQ processes, and discard any remaining segments in the segmentation entity, or buffer).
Extract old MAC-e PDUs already in the HARQ processes and re-create them using the new MAC-e format.
Activate/de-activate the MAC-e adaptation layer and start using the new MAC-e format.

In addition, the Node-Bs 220 already in the active set begin interpreting the new MAC-e header format at the time the WTRU 210 starts to use the same format. This change of format can be signaled via NBAP signaling procedures and the change in the protocol can take place at the given activation time in both the WTRU 210 and Node-B 220.

In yet another embodiment, when a non-enhanced cell is added to an enhanced active set, the WTRU 210 may continue, or start operating in a semi-flexible RLC PDU mode. A semi flexible AM RLC mode is a mode that allows the WTRU 210 to create RLC PDUs of different sizes but within a set of fixed sizes.

When a non-enhanced cell is added to the active set and while the WTRU 210 remains connected to an enhanced SRNC 240, the network configures the logical channel entities to start operating using a semi-flexible RLC PDU mode. The network signals a set of RLC PDU sizes that can be used in acknowledged mode (AM) and their corresponding DDI fields. The RLC is allowed to create an RLC PDU of a size chosen from the configured set, which it may create the RLC PDUs just prior to the transmission time or earlier.

The size chosen by the RLC can be based on one or a combination of the following criteria:

Enhanced uplink transport format combination (E-TFC) selection: The MAC requests the RLC to transmit N PDUs of a size chosen from the configured set. The RLC creates PDUs of the requested size if they match into one of the configured sizes.
The RLC is configured with one maximum RLC PDU size. If there is enough data available, the RLC PDU is set to the maximum size. If not enough data is available to fill the maximum RLC PDU size, the next smallest RLC PDU size is chosen from the configured set, such that the available data is transmitted with minimum padding added.
The MAC tells the RLC every TTI the size of the RLC PDU.
The MAC initially requests an RLC PDU size. The RLC PDU continuously creates RLC PDUs of the requested size, until the MAC changes the request.
An absolute maximum RLC PDU size and a minimum RLC PDU size can be configured.

The semi-flexible RLC PDU may allow the WTRU 210 to adjust to the selected E-TFC while still being able to use the same non-enhanced MAC headers, that is capable of indicating the size of the RLC PDU from a configured set and the number of RLC PDUs of the same size, (i.e., DDI and N fields).

However, the current non-enhanced MAC has a restriction of only including MAC SDUs of the same size from one logical channel in a MAC-es PDU. Accordingly, the MAC may perform one or more procedures.

For example the MAC may only allow RLC PDUs of the same size in one MAC-es PDU. This will restrict the RLC from creating or sending to the MAC RLC PDUs of different sizes. This can result in scenarios where a retransmitted RLC PDU size is different than the size of a RLC PDU that is being transmitted for the first time. The transmitter can then only transmit the retransmitted RLC PDU in that TTI and wait for the next TTI to transmit the next one. Alternatively, the RLC PDU can wait and at the given TTI if a retransmission is occurring and there is still available space in the TB, it can create one or more new RLC PDU(s) of the same size as the retransmitted one. Optionally, a restriction can be applied to this rule, such that the RLC is not allowed to create a RLC PDU of a larger size than the one requested by the MAC, even if the retransmitted RLC PDU is larger.

Also, the MAC may support RLC PDUs of different size in one TTI. This may be done by creating several MAC-es PDU corresponding to the same logical channel but with different DDI fields.

When a non-enhanced Node-B 220 is added to the active set and the transmitter is configured with a semi-flexible RLC PDU mode, the MAC protocol has to change such that the non-enhanced Node-B 220 will be capable of decoding the MAC-e PDU. Accordingly, MAC configuration may be performed.

In one example, the MAC is configured to operate as a non-enhanced MAC. Therefore, the current Release 6 MAC-es and MAC-e header format are used and the MAC may not have segmentation capabilities.

Alternatively, the MAC may be configured to use the current non-enhanced MAC-e header format, however it has the capability to perform segmentation. This will allow the MAC to handle RLC retransmission, which have larger sizes than the selected transport block size. In order, to support segmentation together with the old MAC-e header format, the WTRU 210 may only create segments of size equivalent to one of the configured set of RLC PDU sizes. The MAC-es header signals the TSN and SI value, whereas the MAC-e will signal the DDI and N value.

If the remaining segment is smaller or doesn't fit exactly into one of the DDI sizes, padding may be used to complete the PDU to the next smallest DDI value. Alternatively, the MAC may not segment the RLC PDU if there is no possible segmentation combination that will result in all segments having a size matching to one of the DDI values.

If padding in the MAC is allowed for the case where segmentation is performed, the MAC-es header has to signal to the network that padding bits have been added. This may be done by adding an additional bit to the MAC-es header format, and if the bit is set, another field indicating where the segment ends and the padding bits are added. Optionally, the receiver side, (i.e., Node-B 220 and RNC), may only check if the padding bit indicator is present only if it knows that the MAC-es contains a segment. The receiving MAC-es side is introduced with the functionality of removing the padded bits and reassembly of the segments.

The change of configuration from flexible to semi-flexible or vice versa and from fixed to semi-flexible and vice versa, and the change of MAC may be signaled using one of the ways described previously.

In addition, some of the methods described above may have the potential to cause a loss of data. Accordingly, data recovery may be beneficial when an event occurs that might cause data loss. For example, any of the following procedures may result in a need for a data recovery operation:

- The WTRU 210 moves from an enhanced to a non-enhanced L2 protocol.
- The SRNS is changed.
- A handover that orders a MAC-i/is reset or reconfiguration is performed.
- A MAC-i/is reset in CELL_DCH or CELL_FACH is performed.
- A MAC-i/is reset is performed.
- E-DCH resources in CELL_FACH have been released via an explicit indication from the Node-B 220 and the WTRU 210 has to discard the segment from the MAC-i/is segmentation entity without having to perform a MAC-i/is reset.
- Upon transition from CELL_FACH to CELL_DCH, wherein a MAC-i/is reset is performed or the WTRU 210 is required to flush the HARQ processes.
- A WTRU 210 is required to discard a segment in the segmentation entity of the MAC-i/is entity.

When one of the scenarios mentioned above occurs, the MAC communicates with the RLC such that the RLC can recover data that was not successfully or fully transmitted by the MAC. The MAC may notify the RLC of a failed RLC PDU.

For example, a segment is stored in one of the segmentation buffers/entities of the MAC. In the scenarios described above, the segment in the segmentation entity will be discarded, and therefore the RLC PDU may not be successfully transmitted/reassembled without this segment. Therefore, the MAC notifies the corresponding RLC entity that the segment pertaining to the RLC PDU was never transmitted if the RLC entity corresponds to an AM RLC entity. The RLC may then trigger a retransmission upon reception of this indication to allow for faster recovery of the data. Also, if the segment corresponds to a UM RLC entity, the MAC may notify the RLC of the failed PDU and the UM RLC entity may discard the RLC SDU and any other PDUs associated to the corresponding SDU.

Additionally, the MAC may notify the RRC layer of the discarded segment if the segment corresponds to an SRB or if it belongs to a CCCH message. This may allow the RRC to recover the message and retransmit it without having to wait for the RRC procedure timer to expire.

Another way of recovering data involves HARQ processes that contain data that was transmitted but not acknowledged. In this scenario, the MAC notifies the RLC of all the PDUs in its HARQ buffers.

To support the above methods of data recovery, the MAC-i/is reset procedure may be modified, such that before the discarding of the stored segment, the MAC-i/is entity notifies the corresponding RLC of the segment stored in its buffer, and the RLC PDU to which it belongs. It should also be noted that the data recovery methods described apply to MAC-e/es entities as well.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for supporting uplink (UL) protocol changes, comprising:
   operating under a first medium access control (MAC) protocol;
   in response to receiving a protocol change trigger, reconfiguring the MAC protocol from operation in the first MAC protocol to operation in a second MAC protocol;
   flushing a hybrid automatic repeat request (HARQ) process associated with operation in the first MAC protocol; and
   performing a MAC-e/es reset, wherein the performing of the MAC-e/es reset comprises discarding segments in a segmentation entity.

2. The method of claim 1, further comprising receiving a MAC-e/es reset indication.

3. The method of claim 2 wherein the MAC-e/es reset indication is received via radio resource controller (RRC) signaling.

4. The method of claim 3 wherein the RRC signaling includes an RRC reconfiguration message.

5. The method of claim 2 wherein the MAC-e/es reset indication is received via an active update message.

6. A method for performing a MAC-e/es reset, comprising:
in response to receiving a protocol change trigger, flushing a hybrid automatic report request (HARQ) process;
setting a state variable to zero for logical channels mapped to an enhanced dedicated channel (E-DCH); and
discarding segments in a segmentation entity.

7. A wireless transmit/receive unit (WTRU), comprising:
a receiver;
a transmitter; and
a processor in communication with the receiver and the transmitter, the processor configured to, in response to receiving a protocol change trigger, flush a hybrid automatic repeat request (HARD) process, set a state variable to zero for all logical channels mapped to an enhanced dedicated channel (E-DCH), and discard segments in a segmentation entity.

8. The WTRU of claim 7 wherein the processor is further configured to notify a radio link controller (RLC) of a failed RLC packet data unit (PDU).

9. The WTRU of claim 8 wherein the processor is further configured to retransmit the failed RLC PDU.

10. The WTRU of claim 9 wherein the processor is further configured to discard the PLC PDU after transmission.

11. The WTRU of claim 9 wherein the processor is further configured to notify the RLC of PDUs present in a hybrid automatic repeat request (HARD) buffer.

* * * * *